UNITED STATES PATENT OFFICE.

OTTO FRITZ REINHOLD, OF MAPLEWOOD, NEW JERSEY, ASSIGNOR, BY DIRECT AND MESNE ASSIGNMENTS, TO FOSTER REINHOLD LABORATORIES, OF NEWARK, NEW JERSEY, A CORPORATION OF NEW JERSEY.

ALUMINUM ALLOY AND PROCESS OF ALLOYING ALUMINUM.

1,362,739.    Specification of Letters Patent.    Patented Dec. 21, 1920.

No Drawing.    Application filed April 22, 1919. Serial No. 291,930.

*To all whom it may concern:*

Be it known that I, OTTO F. REINHOLD, of Maplewood, New Jersey, have invented certain new and useful Improvements in Aluminum Alloys and Processes of Alloying Aluminum, of which there follows a full and complete description.

This invention relates to a process of forming what will be termed an aluminum alloy, as a coating on an aluminum or an aluminum alloy plate. The exact character, physical and chemical, of the union formed between aluminum and other metals in the practice of the invention is not known, so it is to be understood that the term "alloy" is used loosely throughout the specification and claims and where so used is intended merely to cover the union of metals in the peculiar manner resulting from my discovery.

The invention resides, broadly, in the discovery that when aluminum and any other metal or alloy thereof are brought together in the presence of an amido-substitution-compound of the nitrogen compounds, and heated, a coating for aluminum is formed which renders the resulting alloy or the aluminum so coated, adaptable to use in many fields from which aluminum has heretofore been barred because of its properties. The term "amido-substitution-compound of meta-carbonic acid" has been selected as seeming to best express that group in which I am working and in which, I believe, will be found the equivalent chemicals for accomplishing my purposes. Of these compounds, urea is one which will be described in its action, by way of example.

Efforts to adapt aluminum to use in storage batteries have been unavailable. The lightness of the metal makes it obviously desirable in this field. I consider the adaptation of aluminum as a plate for a storage battery to be one of the most important uses of my invention and so this use will be described in some detail herein, without, lessening the importance of other alloys of aluminum or aluminum alloy plates formed or coated in accordance with the invention, for use in their appropriate fields.

This plate may be formed of an aluminum sheet coated with a composition of lead chlorid and urea. The lead chlorid and the urea are mixed together and when applied to the aluminum in the presence of heat the lead and aluminum appear to have a peculiar affinity. The lead is bound or knit to the surface of the aluminum in such manner that the two become as one homogeneous mass. If any aluminum penetrates the lead, even to the surface thereof, it is found that the presence of the urea during the uniting appears to have rendered the aluminum passive. It does not oxidize readily. However, the lead coating is relied on primarily for the electrolytic action when the plate is used in a storage battery. The aluminum plate then serves as a carrier for the lead. The saving in weight is very great and the desirability of this saving in storage batteries will be appreciated without particular emphasis. The action of the plate appears to be like that of any known plate in a battery. The potential of a cell appears to be as great as is found in any standard battery on the market. If desired, it will be understood that the plate may be formed as a grid and coated throughout in the manner described. Lead oxid or the like may then be packed in the grid in a manner now common. The electrolyte employed may be any usual one.

In using the plate described it may be found that the coating of lead will eventually be reduced to a point where little potential can be detected. The plate may then be recoated with the improved composition and the activity will be as before. A battery having plates formed of an aluminum alloy might have the cell composed of two sections of aluminum insulated from one another and each carrying a plate and the inner walls of the container might be made electro-active by coating them with the improved composition, all as described particularly hereinbefore. I do not, however, in this application desire to limit myself to the construction of the battery but seek to cover, broadly, an aluminum or aluminum alloy plate adapted to storage battery purposes. Whether urea, or any other one of the amido-substitution-compounds of meta-carbonic acid is employed to effect the peculiar union of aluminum with other metals does not affect the scope of the invention, nor do I limit myself to the employment of lead as the electrode as other metals or alloys may be equally desirable in obtaining the results.

Closely related to the described example of one application of my invention is the solution of a problem which it offers in connection with the storage or transfer of liquids, particularly acids. By the coating process described, it becomes possible to unite with an aluminum container or receptacle a surface coating of any metal which shall be impervious to attack by the liquid to be contained. Very often, a lead surface composition will be the one required in which case the lead may be applied to the surface of an aluminum sheet, in the presence of urea, in the manner described. Other metals may be alloyed with aluminum or applied to the surface of aluminum or an alloy thereof in a more effective manner than heretofore known with the result that a metal of light weight may be secured to meet almost any condition of use. In making up such an alloy or coating the properties of the metal which is to be united with aluminum will be kept in mind and that metal which will satisfy the conditions of use will be selected. It is on this basis of selection that the use of lead in connection with a storage battery plate is described.

What I claim is—

1. The process of uniting a metal with aluminum or an aluminum alloy which consists in applying the metal to the surface of aluminum or its alloys in the presence of an amido-substitution-compound of meta-carbonic acid, with heat.

2. The process of uniting a metal with aluminum or an aluminum alloy which consists in applying the metal to the surface of aluminum or its alloys in the presence of urea, with heat.

3. An aluminum plate having its surface treated with a metallic salt in the presence of an amido-substitution-compound of meta-carbonic acid, with heat.

4. An aluminum plate having its surface treated with a metallic salt in the presence of urea, with heat.

5. An aluminum plate having its surface treated with lead chlorid in the presence of an amido-substitution-compound of meta-carbonic acid, with heat.

6. An aluminum plate having its surface treated with lead chlorid in the presence of urea, with heat.

7. The process of forming a plate for use in storage batteries, of aluminum or aluminum alloy, which consists in applying an amido-substitution-compound of meta-carbonic acid to its surface in the presence of heat.

8. The process of forming a plate for use in storage batteries, of aluminum or aluminum alloy, which consists in applying urea to its surface in the presence of heat.

This specification signed this 21st day of April, A. D. 1919.

OTTO FRITZ REINHOLD.